March 11, 1952     C. L. HUBBARD ET AL     2,588,386
AUTOMATIC GRAPH TRACKER AND METHOD
Filed May 18, 1949
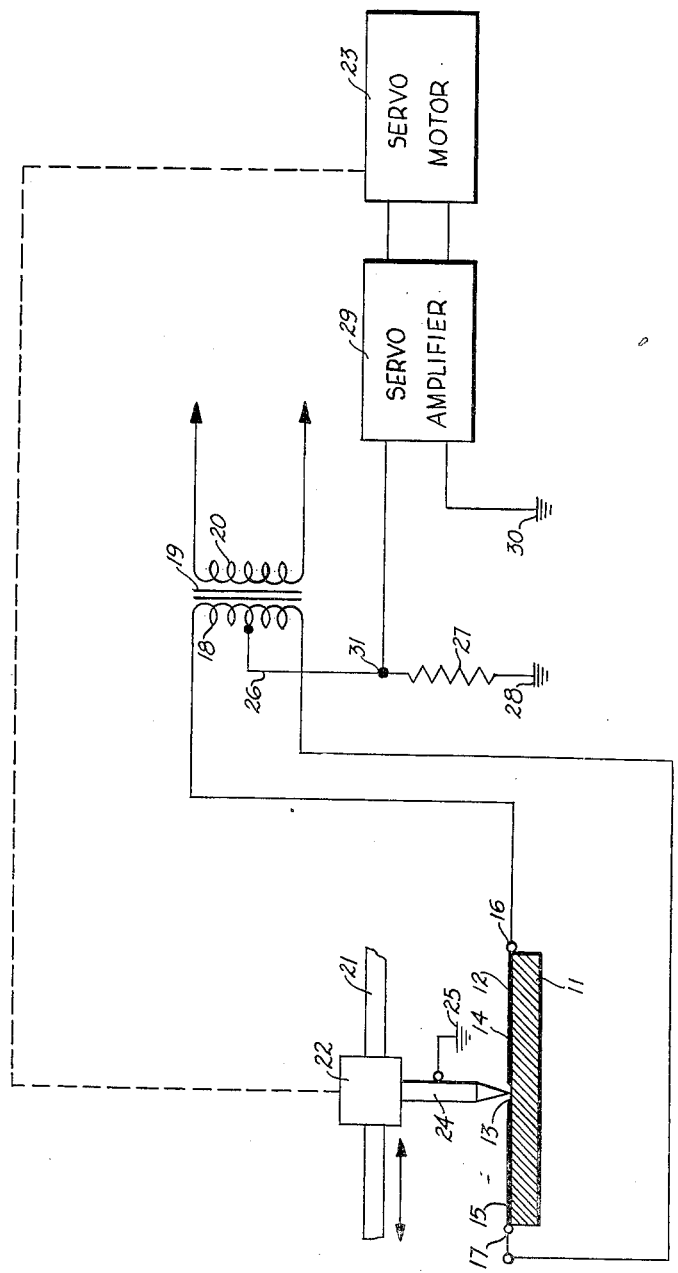
INVENTORS
ACHILLE CAPECELATRO
CHARLES L. HUBBARD
BY
ATTORNEY Patented Mar. 11, 1952

2,588,386

UNITED STATES PATENT OFFICE 2,588,386

AUTOMATIC GRAPH TRACKER AND METHOD

Charles L. Hubbard, Huntington, Ind., and Achille Capecelatro, Madison, N. J.

Application May 18, 1949, Serial No. 94,034

2 Claims. (Cl. 318—162)

(Granted under the act of March 3, 1883, as amended April 30, 1928; 370 O. G. 757)

The present invention concerns an automatic graph tracker and method for keeping a follower on an irregular graph during relative movement of the follower along the graph. In particular the invention concerns such an automatic graph tracker for use with computers, integrators and course setters.

The automatic graph tracker of the present invention is constructed to follow an irregular graph on any surface when the graph is a poorer conductor of electricity than the surface and when the graph divides the surface into two portions that are insulated from each other by the graph and at different potentials. A graph and surface of this type can be provided by painting a nonconducting surface such as glass or Bakelite with a thin layer of conducting paint and then scribing the desired graph through the paint layer to the nonconducting surface beneath.

The graph tracker of the present invention includes a crosscarriage to traverse at constant speed the length of the surface containing the insulating graph. Mounted slidably on the crosscarriage is a follower unit incorporating a contactor and driven in a direction normal to the crosscarriage motion by a servomotor. A servo amplifier develops signals that energize the servomotor and such signals are in response to the potential sensed by the contactor after it moves from the insulated graph to either side on the conducting surface. The servomotor direction depends on signal phase which, in turn, is determined by the side of the insulating graph on which the contactor moves out of alignment. The servomotor drives the contactor back into alignment on the graph from any starting position on the adjacent surface.

An object of the invention is to provide an automatic graph tracker and method.

Another object is to provide an automatic graph tracker for keeping a follower on an irregular graph during relative movement of the follower along the graph with such graph tracker adapted for use with computers, integrators and course setters.

Another object is to provide in combination with a nonconducting graph having conducting surfaces on opposite sides thereof and in which the opposite sides are at different potentials, a graph tracker comprising a carriage, a follower incorporating a contactor slidably mounted on the carriage for movement in contact with graph, a servomotor connected to drive the contactor, and means for controlling the position of the servomotor in accordance with the potential sensed by the contactor whereby the contactor is maintained on the graph.

Another object is to provide a method of graph reading comprising forming a nonconducting graph having conducting surfaces on opposite sides of the graph, maintaining the opposite sides at different potentials, moving a follower along the graph, and controlling the position of the follower in accordance with the potential sensed by the follower, whereby the follower is maintained on the graph.

Further objects and advantages of this invention as well as its construction, arrangement and operation will be apparent from the following description and claims in connection with the accompanying drawing in which:

The single figure is a diagrammatic view of a preferred embodiment of the invention.

There is shown a body 11 of glass, Bakelite or other nonconducting material having thereon a thin layer of conducting paint 12. A graph 13 is scribed through paint layer 12 to the nonconducting surface of body 11 and insulating graph 13 insulates opposite sides 14 and 15 of the paint layer from each other. Portions 14 and 15 of paint layer 12 are connected respectively at 16 and 17 to the opposite sides of secondary winding 18 of a transformer 19 the primary winding 20 of which is connected to a suitable source of power (not shown).

There is provided a crosscarriage 21 adapted to traverse the length of surface 12 (in a direction perpendicular to the sheet of drawing) containing graph 13 at a constant speed. Mounted on crosscarriage 21 is a follower unit 22 driven in directions shown by arrows normal to the crosscarriage motion by a servomotor 23. The connection between follower 22 and servomotor 23 is illustrated diagrammatically by a dotted line and can be of any conventional type. Follower unit 22 carries a contactor 24, the extremity of which is adapted for sliding contact along graph 13 and the surface of layer 12. Contactor 24 is grounded as indicated at 25. Transformer secondary winding 18 is connected by a conductor 26 to a load resistor 27 and a ground connection 28. Coupled with servomotor 23 and adapted to energize servomotor 23 is a servo amplifier 29 having a ground connection 30 and connected at 31 with conductor 26. Servo amplifier 29 is phase-sensitive and for this purpose can be connected in suitable manner (not shown) with the input of transformer primary winding 20 in conventional manner.

In operation, if contactor 24 is in alignment with graph 13, no signal is developed in servo amplifier 29 and follower 22 is not driven by servomotor 23. If contactor 24 moves off graph 13 on either side, it completes the circuit through load resistor 27 to provide in servo amplifier 29 a signal that energizes servomotor 23. The direction of movement of follower 22 depends on the signal phase in servo amplifier 29 which, in turn, is determined by the side of the insulating graph 13 on which contactor 24 moves out of alignment. Consequently, servomotor 23 drives stylus 24 back into alignment from any starting position on surface 12.

The maximum graph slope that the device can follow accurately is equal to the speed of servomotor 23 divided by speed of crosscarriage 21. If this slope is exceeded, stylus 24 will drive in the correct direction at maximum slope until contact is again made. If the speed of crosscarriage 21 is regulated to be inversely proportional to the speed of servomotor 23 the system can follow any slope accurately.

Crosscarriage 21, which travels at a constant speed the length of the surface containing insulating graph 13, can be replaced by a cam or other suitable linkage to extend the range of movement of the device.

Obviously many modifications and variations of the present invention are possible in the light of the above teachings. It is therefore to be understood that within the scope of the appended claims the invention can be practiced otherwise than as specifically described.

The invention described herein may be manufactured and used by or for the Government of the United States of America for governmental purposes without the payment of any royalties thereon or therefor.

We claim:

1. In combination, a non-conducting graph, conducting surfaces on opposite sides of and insulated by said graph, means for applying a potential to each of said surfaces, said potentials being different, a graph tracker comprising a crosscarriage adapted for movement along the graph, a follower slidably mounted on said crosscarriage for movement normal to the crosscarriage movement, means for moving said crosscarriage, a contactor on said follower for alternative contact with the graph and adjacent surfaces, a servomotor connected to drive said follower, a phase-sensitive servo amplifier connected to said servomotor to energize said servomotor, and electrical means interconnecting said servo amplifier and contactor for supplying an electric signal to said servo amplifier, whereby said amplifier provides an output signal having a phase corresponding to the sense of the instant deviation of the contactor from said graph, and means coupling the output of said amplifier to said motor.

2. In combination, a non-conducting graph, conducting surfaces on opposite sides of and insulated by said graph, means for applying a potential to each of said surfaces, said potentials being different, a graph tracker comprising a crosscarriage adapted for movement along the graph, a follower slidably mounted on said crosscarriage for movement normal to the crosscarriage movement, means for moving said crosscarriage, a contactor on said follower for alternative contact with the graph and adjacent surfaces, a servomotor connected to drive said follower, a phase-sensitive servo amplifier connected to said servomotor to energize said servomotor, electrical means interconnecting said servo amplifier and contactor for supplying an electric signal thereto, whereby said amplifier provides an output signal having a phase corresponding to the sense of the instant deviation of the contactor from said graph, means coupling the output of said amplifier to said motor, and means for regulating the speed of movement of said crosscarriage to be inversely proportional to the speed of said servomotor.

CHARLES L. HUBBARD.
ACHILLE CAPECELATRO.

REFERENCES CITED

The following references are of record in the file of this patent:

UNITED STATES PATENTS

| Number | Name | Date |
|---|---|---|
| 1,295,572 | Newcomb | Feb. 25, 1919 |
| 1,320,580 | Somerville | Nov. 4, 1919 |
| 1,696,512 | White | Dec. 25, 1928 |
| 1,749,842 | Pfretzschner | Mar. 11, 1930 |
| 2,262,354 | Cates | Nov. 11, 1941 |
| 2,330,822 | Fischer | Oct. 5, 1943 |
| 2,347,590 | Binder | Apr. 25, 1944 |
| 2,354,391 | McCourt | July 25, 1944 |